United States Patent [19]

Pereira

[11] Patent Number: 4,796,953
[45] Date of Patent: Jan. 10, 1989

[54] AUTOMOTIVE ADJUSTABLE HEAD & NECK REST

[76] Inventor: Anthony S. Pereira, 207 Ashurst Ave., Secane, Pa. 19018

[21] Appl. No.: 121,664

[22] Filed: Nov. 16, 1987

[51] Int. Cl.⁴ .............................................. A47C 7/38
[52] U.S. Cl. .................................... 297/400; 297/408 297/409
[58] Field of Search ............... 297/191, 194, 402, 400, 297/408, 409, 391, 410, 406, 407; 248/231.4, 286, 298

[56] References Cited

U.S. PATENT DOCUMENTS

| | | | |
|---|---|---|---|
| 313,781 | 3/1885 | Starr et al. | 277/400 |
| 361,528 | 4/1887 | Karanjian | 297/402 |
| 2,632,497 | 3/1953 | Brady | 297/409 X |
| 2,652,101 | 9/1953 | Samsky et al. | 297/409 X |
| 2,666,476 | 1/1954 | Lycan | 297/409 X |
| 2,667,913 | 2/1954 | Dustin | 297/252 X |
| 3,547,486 | 12/1970 | Herzer | 297/408 |
| 3,603,642 | 9/1971 | Laessker | 297/408 |
| 4,266,760 | 5/1981 | Mahsui et al. | 297/408 X |

FOREIGN PATENT DOCUMENTS 525962 2/1954 Belgium ........................ 297/400

Primary Examiner—Kenneth J. Dorner
Assistant Examiner—Peter R. Brown
Attorney, Agent, or Firm—Leon Gilden

[57] ABSTRACT

An automotive adjustable head rest is selectively securable to an existing seat-head & neck rest arrangement to enable selective positioning of a user's head. Adjustable "U" shaped clamps are in a first embodiment securable to an existing seat-head rest organization where a releasably securable pivotal positioner enables pivoting of said head and neck rest to a desired orientation relative to a user. Alternatively, the head & neck rest arrangement may be formed as a permanent operative unit with a seat by telescoping and retracting such head & neck rest within the seat for selective use and again including a pivoting positioner to enable forward pivoting of said head & neck rest.

1 Claim, 1 Drawing Sheet

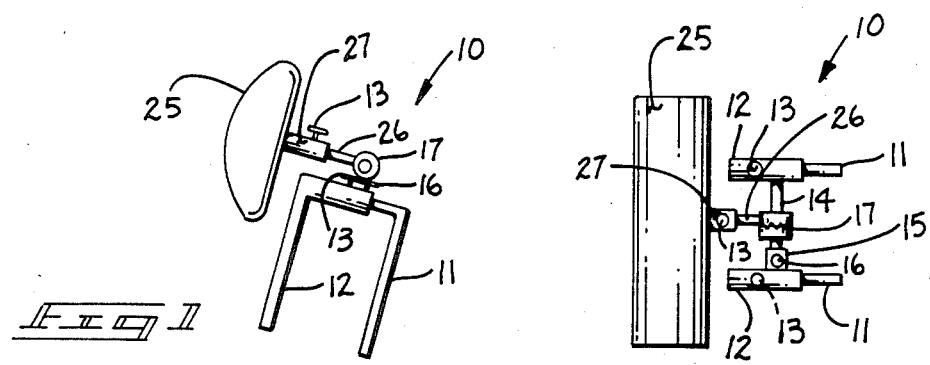
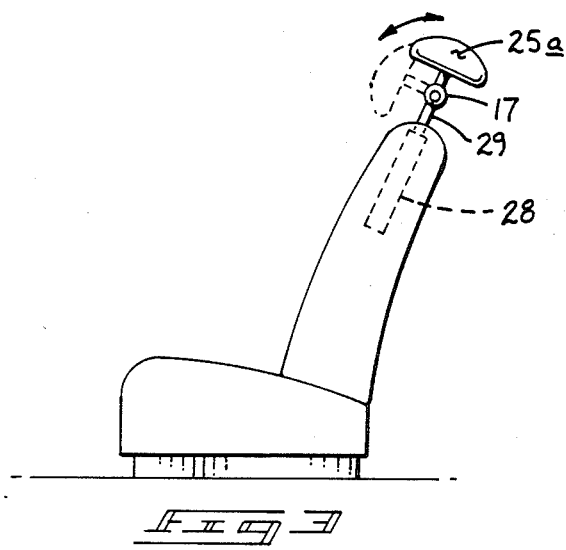
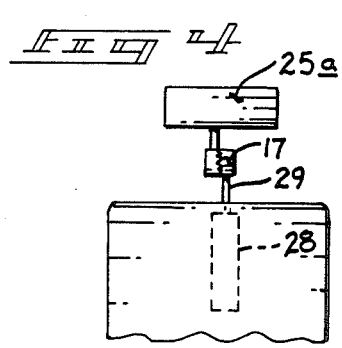
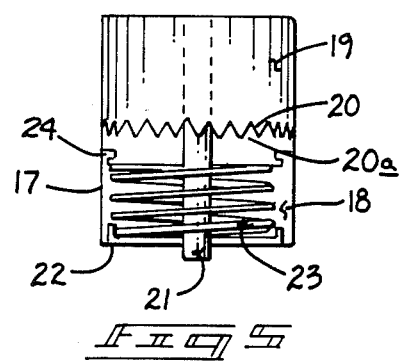

AUTOMOTIVE ADJUSTABLE HEAD & NECK REST

BACKGROUND OF THE INVENTION

1. Field of the Invention

The present invention relates to head & neck rest devices, and more particularly pertains to a new and improved automotive head rest which may be adapted to a wide variety of seats and physical relationships of said seats to an ultimate user. Alternatively, the head rest may be formed as a permanent part of the seating arrangement.

2. Description of the Prior Art

The use of automotive head rests and apparatus of this type is well known in the prior art. It may be appreciated that these devices have normally required a relatively fixed orientation to accommodate a theoretical average user of these devices. In practice, however, due to a variety of desired driving conditions based on personal preference of a user and various physical characteristics of such users, the typical head rest available in automobiles has not been adequate to accommodate actual needs. In this connection, there have been several attempts to develop head rests which may be effectively and readily accommodating of various users. For example, U.S. Pat. No. 482,520 to Field is an early example of a head rest wherein a rather elaborate pivoting relationship of a head rest relative to a seat is presented. The Field head rest, however, requires substantial and elaborate linkage and space therefore. Accordingly a device of this type is of limited value in a contemporary automotive environment.

U.S. Pat. No. 668,765 to Beach relates to a portable head rest as may be utilized with seats wherein a vertically oriented adjustable strap arrangement is securable about an upper and lower seat periphery to grasp said seat and secure said head rest thereto. The Beach construction is incompatible with contemporary seats wherein lowermost peripheries of a seat is not accessible for securement as set forth in Beach.

U.S. Pat. No. 2,056,479 to Newman presents a collapsible head rest comprising a framework securable to an upper portion of a seat by vertically positioned straps securable to a seat's lowermost periphery and as previous, each patent is again incompatible with contemporary constructions and furthermore, seats of this class do not provide a degree of adjustability enabling accommodation of varying physiques commonly found associated with the human anatomy.

U.S. Pat. No. 2,624,397 to Aubinn sets forth an adjustable head rest that clamps over an existing seat periphery but lacks the adjustment necessary in accommodation of various physiques and automotive driving situations.

U.S. Pat. No. 3,337,268 to Belk illustrates the use of a permanent adjunct head rest arrangement for use with vehicle seats wherein tubular portions are permanently attached to a rear face of an automotive seat and telescoping tubular elements are adjustable therein to provide a vertically adjustable head rest arrangement.

U.S. Pat. No. 4,498,704 to Hildreth sets forth a head rest arrangement to accommodate a somewhat flexible back rest of a chair, such as in a wheel chair arrangement, in that a rather narrow back rest is accommodated between spaced plate portions to provide a desired head rest. The adaptability of the Hildreth reference to an automotive seat and particularly the lacking of articulation means to accommodate varying configurations and positions of a user is not available.

As such, it may be appreciated that there is a continuing need for a new and improved automotive head rest which addresses both the problem of storage, portability and accommodation of varying physical requirements, and in this respect, the present invention substantially fulfills this need.

SUMMARY OF THE INVENTION

In view of the foregoing disadvantages inherent in the known types of automotive head rests now present in the prior art, the present invention provides an automotive head & neck rest wherein a plurality of adjustable "U" shaped clamps accommodates a variety of head rest-seat arrangements and by means of articulation means enables pivoting and adjustment of the head & neck rest to accommodate a variety of physical configurations of users. As such, the general purpose of the present invention, which will be described subsequently in greater detail, is to provide a new and improved automotive head & neck rest which has all the advantages of the prior art automotive head rests and none of the disadvantages.

To attain this, the present invention comprises a portable selectively attachable head & neck rest arrangement wherein a pair of adjustable "U" shaped clamps are securable to a variety of automotive head rest type and seat arrangements and adjustable relative to one another to accommodate same. A releasable pivoting positioner is associated with said clamps and integrally attaches said "U" shaped clamps and said head rest to further enable pivoting and positioning of a telescoping head rest arrangement to thereby accommodate a variety of individuals. A modification includes permanent association of said head & neck rest to an automotive seat arrangement where a telescoping linkage has associated thereto a pivoting positioner to enable forward pivoting of a head rest to accommodate a variety of individuals and driving conditions.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive head & neck rest which has all the advantages of the prior art automotive head rests and none of the disadvantages.

It is another object of the present invention to provide a new and improved automotive head & neck rest which may be easily and efficiently manufactured and marketed.

It is a further object of the present invention to provide a new and improved automotive head & neck rest which is of a durable and reliable construction.

An even further object of the present invention is to provide a new and improved automotive head & neck rest which is susceptible of a low cost of manufacture with regard to both materials and labor, and which accordingly is then susceptible of low prices of sale to the consuming public, thereby making such automotive head rests economically available to the buying public.

Still yet another object of the present invention is to provide a new and improved automotive head & neck rest which provides in the apparatuses and methods of the prior art some of the advantages thereof, while simultaneously overcoming some of the disadvantages normally associated therewith.

Still another object of the present invention is to provide a new and improved automotive head rest that may be selectively attachable to an existing head rest-seat arrangement.

Yet another object of the present invention is to provide a new and improved automotive head & neck rest wherein a selectively attachable head rest is pivotally displaceable about a pivoting securement member to enable arcuate rotation of said to accommodate a variety of individuals and driving conditions.

Even still another object of the present invention is to provide a new and improved automotive head & neck rest permanently associated with an automotive seat to both telescope relative to said seat and pivot relative thereto to accommodate a variety of individuals and driving conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side orthographic view of the present invention.

FIG. 2 is a top orthographic view comprising the instant invention.

FIG. 3 is a side orthographic view of a modification of the instant invention.

FIG. 4 is a front orthographic view of the instant invention.

FIG. 5 is a cross-sectional view of the pivoting positioner member enabling selective pivoting of the head rest of the instant invention.

DESCRIPTION OF THE PREFERRED EMBODIMENT

With reference now to the drawings, and in particular to FIG. 1 thereof, a new and improved automotive head & neck rest embodying the principles and concepts of the present invention and generally designated by the reference numeral 10 will be described.

More specifically, it will be noted that the automotive head & neck rest apparatus 10 essentially comprises a plurality of first telescoping portions 11 receivable within second telescoping portions 12 forming "U" shaped members to accommodate an automotive head rest-seat arrangement. Thumb screw-type clamps 13 secure the first and second telescoping portions in a desired clamping spacing arrangement. The thusly formed "U" shaped members are secured together by a first bridge member 14 telescoping within a second bridge member 15 secured in a desired relationship by a second clamp 16.

A pivotal positioner member 17 is secured to said first bridge portion 14. Positioner member 17, as best illustrated in FIG. 5, is formed of a forward portion 18 and a rearward portion 19 interfacing together in a non-rotatable fashion by means of inter-engaging teeth portions 20 and 20a formed of respective displaceable portions 19 and 18 respectively. A spring-loaded plunger 21 is manually engageable to depress a spring 23 captured between circular flange portion 22 and rim circumferential perimeter flange 24. When spring plunger 21 is depressed, rearward portion 19 integrally associated with plunger 21, is positioned to disengage respective teeth 20 and 20a and enable rotation of the two relative portions 18 and 19 thereby. Accordingly, padded head & neck support member 25 secured to forward portion 18 is rotatable about an arc and adjustable to accommodate a desired position by a user. Securing support member 25 to forward portion 18 is a telescoping link arrangement formed of a rearward link 26 telescoping within a forward link 27 and secured by a clamp 13 similar to the clamps engaging first and second telescoping portions 11 and 12.

A second embodiment illustrated in FIG. 3 depicts a lower telescoping member 28 slidably receiving an upper telescoping member 29 in a frictional engagement to enable positioning of member 29, as desired. A pivotal positioner 17 is oriented somewhat medially of upper telescoping member 29 to enable forward pivoting of a further padded head & neck support member 25a in a variety of positions to also accommodate a variety of individual configurations and needs dependent on driving conditions and physiology.

As to the manner of usage and operation of the present invention, the same should be apparent from the above description. Accordingly, no further discussion relative of the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. An automobile head rest for use in combination with an automobile seat comprising, an automobile seat clamp means for securement to an automobile seat including a pair of first "L" shaped portions telescopingly receiving a respective pair of second "L" shaped portions and a bridge member adjustably securing said first pair of "L" shaped portions together;

said bridge member including a single first bridge member telescopingly receivable within a single second bridge member, and said first "L" shaped portions and said second bridge member each including clamp means for respectively securing said second "L" shaped portions and said first bridge member, and wherein a padded head support member is telescopingly securable relative to said automotive seat by means of a telescoping link arrangement including a forward link secured to said automotive head rest telescopingly receiving a rearward link secured to a pivotal positioning means, and wherein said pivotal positioning means is fixedly secured to said first bridge member, and wherein said pivotal positioning means comprises first and second interdigited housing members including a spring therebetween to normally bias said first and second housing members in a first lock position, and said pivotal positioning means including a manually displaceable plunger to displace said first and second housing members to a second unlock position to enable said pivotal movement of said padded head support means relative to said seat clamp means.

* * * * *